Aug. 13, 1929.  W. J. GAGNON  1,724,796
CHAIN MAKING MACHINE
Filed Dec. 23, 1927  2 Sheets-Sheet 1

INVENTOR
WILLIAM J. GAGNON
by his attorneys
Howson and Howson

Aug. 13, 1929.  W. J. GAGNON  1,724,796
CHAIN MAKING MACHINE
Filed Dec. 23, 1927   2 Sheets-Sheet 2
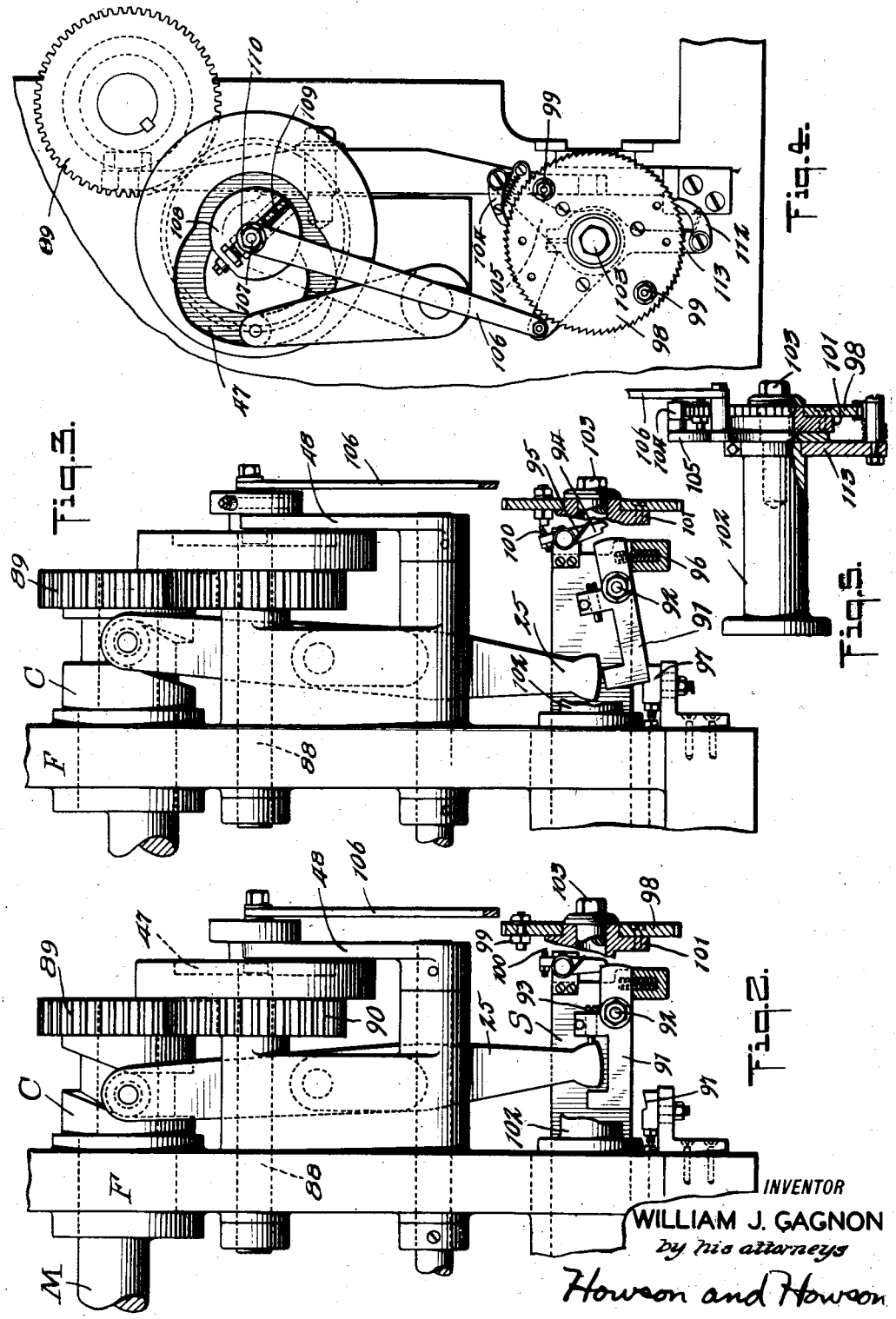
INVENTOR
WILLIAM J. GAGNON
by his attorneys
Howson and Howson Patented Aug. 13, 1929.

1,724,796

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

CHAIN-MAKING MACHINE.

Application filed December 23, 1927. Serial No. 242,167.

This invention relates to a machine for the manufacture of so-called safety chain, also known as sheet metal chain, and more particularly to the manufacture of a plurality of lengths of chain each containing a predetermined number of links.

This invention is more particularly adapted to a machine manufacturing open loop interlooped chain from a continuous strip of stock such as is shown and described in the application of William J. Gagnon, Bernard E. Gagnon and Andrew J. Kosha, filed September 7, 1927, Serial No. 217,936. One of the objects of this invention is to provide means by which the machine shown and described in that application instead of producing a continuous length of chain will automatically produce a series of lengths of chain, each having the desired number of links therein. Another object of the invention is to provide means which will cause the production of these separate lengths of chain without waste of stock and without stopping the operation of the machine. Another object of the invention is to provide a mechanism which can be adjusted to cause the production of pieces of chain of any desired length. Another object of the invention is to provide a mechanism for this purpose which is perfectly synchronized with the other movements of the machine.

In the machine described in the above mentioned application, each link is assembled with its predecessor before it is cut off from the strip of stock, and the threading or interlooping of the new link is done by the same movement that feeds the strip of stock forward through the stamping dies. The present invention contemplates ratchet-controlled means adapted to disconnect the stock-feeding slide from the lever operating it, for a single cycle of operation of the machine, and thus delay the stamping and threading operations till the last link threaded is ejected from the machine. The various operations for cutting off, bending and ejecting the link which the slide threaded on its last forward movement are thus carried out while the threading of the next link and the preceding stages of manufacture are suspended. The machine is so constructed that upon the next cycle of operation the stock is fed forward and the formation of the links for the next length of chain automatically begun without delay.

In the drawings:

Fig. 2 is a rear elevation of one end of the machine showing the link-dropping mechanism while the slide is connected;

Fig. 3 is a similar elevation showing the slide disconnected;

Fig. 4 is an end elevation of the same end of the machine showing the ratchet means which control the rocker arm; while Fig. 5 is a detailed side view of the ratchet means.

Figure 1:
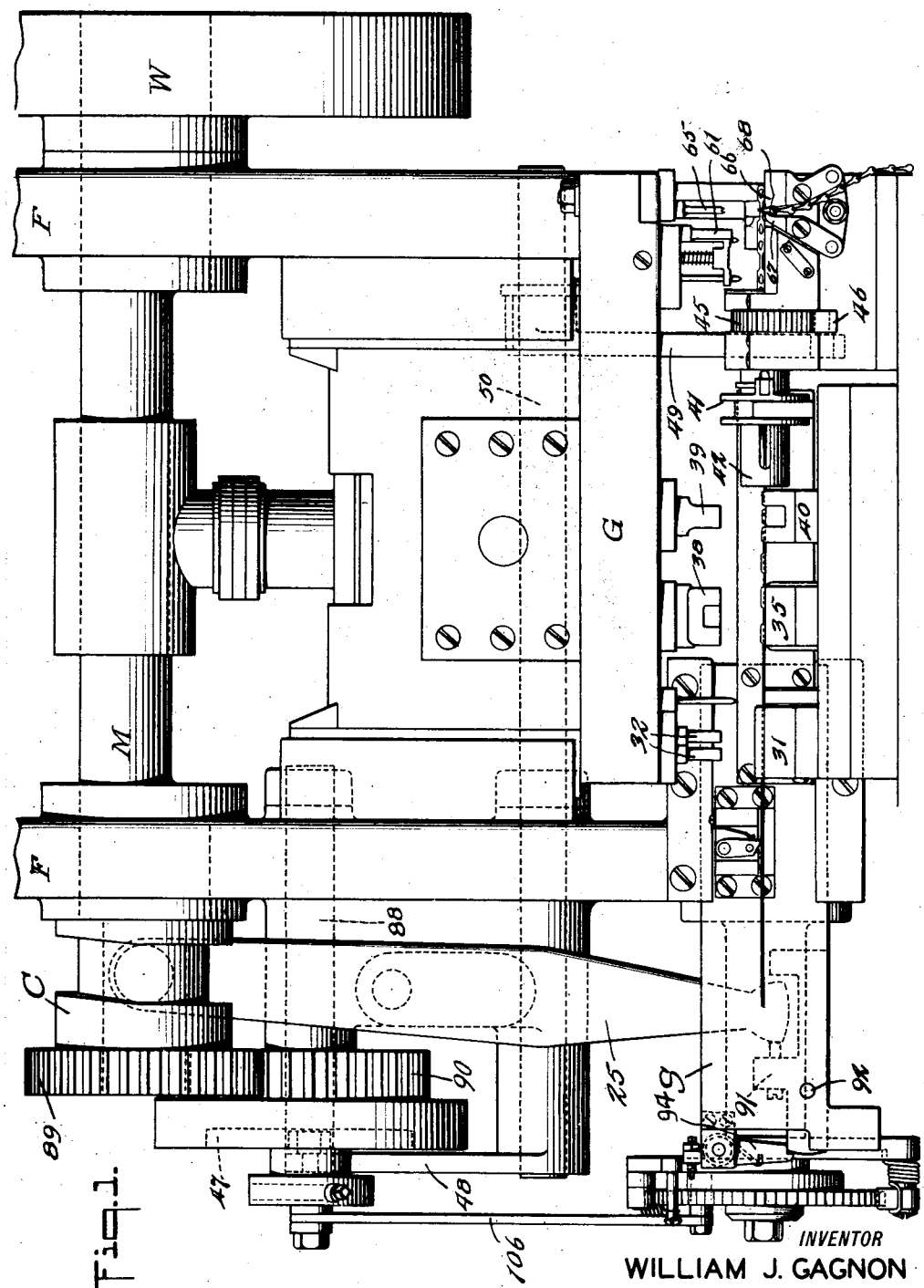
Fig. 1 is a front elevation of a safety-chain machine showing the principal parts, and the novel link-dropping mechanism.

In the example shown in the drawings, the machine frame F carries a fly-wheel W and a main shaft M driven from any suitable source. The continuous strip of stock is fed forward from left to right as the machine is shown in Fig. 1 by a slide S, the stock passing between the various dies and punches 31, 32, 35, 38, 39, and 40 as described in the above mentioned application, Ser. No. 217,936. This horizontally reciprocating slide S is actuated by a cam C on the main shaft M by means of an operating lever 25. The novel mechanism for causing the dropping of a link from the machine without threading the succeeding link through it, causes disconnecting of this slide S from its operating lever 25 as will be described in subsequent paragraphs. The stock after passing through the above mentioned punches and dies is threaded through the previous link by means of a channeled collar 41 sliding on a tubular shaft 42 and oscillated by a sector gear 45 turned by a rack 46. This rack is reciprocated from a side cam 47 by means of a vertical lever 49, horizontal shaft 50 and lever 48. The side cam 47 is mounted on a shaft 88 revolved from the main shaft M by gears 89 and 90. The shearing of the link from the strip after it has been threaded through the previous link is done by a punch 61, mounted on a vertically reciprocating gate G (Fig. 1). The bending of the link to U shape is done by a punch 65 also carried by the gate. Cooperating with this bending punch are forming jaws 66 and 67, forming pin 68 and the link locating member shown and described in the above mentioned application. All these cooperating parts are actuated by the gate G.

The novel means by which the slide S is temporarily disconnected at regular intervals to permit ejection of definite lengths of chain will now be described. The element which actually engages and disengages the slide with its operating lever 25 is a rocker arm 91 having an upwardly facing jaw adapted to embrace the lower end of the operating lever. This rocker arm is pivoted on the back of the slide S by means of a bolt 92. The exact horizontal position of the slide can be adjusted relatively to the dies by means of a horizontal screw 93 mounted in one arm of the jaw, the point of contact of the screw with the lower end of the lever being above the bolt 92. The rocker arm 91 is normally held in a horizontal position by a trip 94 pivotally mounted on the slide and engaging the upper edge of the rocker arm on the opposite side of the bolt 92 from the open jaw which engages the operating lever 25. This trip 94 is normally held in engagement with the rocker arm by a tension spring 95, and as long as the rocker arm is horizontal the movements of the operating lever are transmitted to the slide S.

The operating lever 25 can be disconnected from the slide S by tipping the rocker arm to the position shown in Fig. 3 where the outer end of the jaw is below the end of the operating lever and resting in an adjustable notched block 97 mounted on the frame of the machine. It will be observed that this notch in the block 97 prevents longitudinal movement of the slide S. The rocker arm when freed by the trip will be rocked down to this disengaged position by a compression spring 96 which pushes upwardly on the end engaged by the trip 94.

When the rocker arm has been rocked to this free position the operating lever 25 will move toward the dies and back again under the influence of the cam C on the main drive shaft without moving the slide. Upon its return the lever will contact with the screw 93 and swing the rocker arm up to horizontal position. Unless prevented, the trip 94 will then catch and hold the rocker arm in this locking position.

The trip is actuated by ratchet and pawl means driven from mechanism geared to the main drive shaft, there being a ratchet wheel 98 carrying screws 99 which project into the path of a contact pin 100 located on the upper end of the trip (Fig. 3). When the ratchet wheel is revolved the screws 99 are brought around into contact with the pin 100 at timed intervals, and forcing the pin back out of their path, cause the trip to release the rocker arm. This ratchet wheel 98 is bolted to a spindle 101 revolubly carried on a boss 102 on the main frame of the machine by a shouldered nut 103 (Figs. 4 and 5). The ratchet wheel is racked from a shaft 88 geared to the main drive shaft by gears 89, 90, the racking means comprising a pawl 104 carried on a bell crank lever 105 and a lever 106 pivoted to radially adjustable means on the end of the shaft 88. This radial adjustable means comprises an adjusting screw 109 fixed in position on the disc 108 across the axis of the shaft (Fig. 4). There is a stud 107 on the threads of this screw, which stud is connected to the lever 106 and adapted to be clamped tightly thereto by a nut 110. The radial distance of the stud 107 from the center of the shaft 88 can thus be adjusted by turning the screw 109, and by means of this adjustment the length of movement of the pawl 105 can be changed. Thus it is possible to rack the ratchet wheel forward one or more teeth for every cycle of operation of the machine.

In order to prevent movement of the ratchet wheel in the wrong direction when the pawl 104 is moving back to position itself for a new forward movement, there is a stationary safety pawl 112 mounted on a stationary bracket 113 which holds the wheel from turning. To facilitate timing the machine when starting up operation, the operating pawl 104 is held against the edge of the ratchet wheel by a tension spring 111 fastened to the pawl in such a manner that if the latter is thrust well back out of engagement with the ratchet, the spring will hold it away from the ratchet.

Having now described the construction of the novel link dropping mechanism, its operation will be described. Assuming that the machine is in operation making the first length of chain, the revolution of the drive shaft M is causing the disc 108 on the end of the shaft 88 to revolve, and the stud 107, being eccentrically mounted, is rocking the bell crank lever 105 back and forth in such manner that the operating pawl 104 is racking the ratchet wheel around. When the desired length of chain has been made, one of the screws 99 in the ratchet 98 rises into engagement with the contact pin 100 on the upper end of the trip 94. Up to this time the trip 94 has been holding the rocker arm 91 in horizontal position against the pressure of the spring 96, but the engagement of the screw 99 with the contact pin 100 turns the trip until it loses contact with the rocker arm which is immediately turned downward by the spring 96 to the position shown in Fig. 3. This disengagement of the rocker arm occurs while the slide is in its leftmost position as the machine appears in Fig 1, namely before the slide feeds the stock forward.

The continued revolution of the main shaft causes the operating lever 25 to swing away from the rocker arm and back again under the influence of the cam C and upon its return the lower end of the lever 25 pushing against the adjusting screw 93 pivots the rocker arm back to the horizontal position. In the machine shown in the drawings, the screw 99 on the ratchet wheel has, by this time, been racked around out of contact with the pin 100 and the trip 94, under the influence of the torsion spring 95, catches and holds the rocker arm in its horizontal position. Upon the next cycle of operation the operating lever will therefore be connected to the slide and the machine will once more commence feeding the stock forward.

While the operating lever 25 was idling through its movement without carrying the slide along the bending punch 65 was ejecting the previously formed link from the forming jaws and therefore when the slide, after omitting one reciprocation, feeds the stock forward under the bending punch and the shearing punch, there is no folded link through which the first link can be threaded and therefore a new length of chain is started.

It will be obvious that this invention may be embodied in various other types of chain making machines besides that in which it is illustrated and described and I do not wish to restrict myself to the illustrated machine only.

What I claim is:

1. A machine for automatically making predetermined lengths of chain from strip stock, comprising bending and shearing means, and a reciprocating element feeding the end of the stock to said bending and shearing means, in combination with means causing said reciprocating element to omit its movement for one cycle of the machine.

2. A machine for automatically making predetermined lengths of chain from strip stock, comprising link forming means and a reciprocating slide feeding the stock under the link forming means, in combination with driving means for said link forming means and slide, and means intermittently disengaging said slide from said driving means.

3. A machine for automatically making predetermined lengths of chain from sheet metal stock, comprising a bending punch, and a shearing punch and a reciprocating slide threading the stock through a previously formed link, in combination with a drive shaft for said punches and slide, and means adapted to disengage said slide from said shaft and to engage it again after one cycle of the machine.

4. A machine for automatically making predetermined lengths of chain from sheet metal stock, comprising a bending punch and a reciprocating element threading the end of the stock through a previously bent link, in combination with an operating lever for said slide, a rocker arm connecting said lever to said slide, and a trip adapted to hold said arm in engagement with said slide.

5. A machine for automatically making predetermined lengths of chain from sheet metal stock comprising a bending punch and a reciprocating slide adapted to interloop the end of the stock through a previously bent link, in combination with an operating lever for said slide, a rocker arm connecting said lever to said slide, and a trip adapted to hold said arm in engaging position, said rocker arm being adapted after it has been disengaged to resume engaging position when pushed by said operating lever.

6. A machine for automatically making predetermined lengths of chain from a continuous strip of stock comprising a reciprocating slide adapted to feed the stock forward, a rocker arm on said slide, and a trip adapted to hold said rocker arm in engaging position, in combination with an operating lever adapted to be connected to said slide by said rocker arm when said rocker arm is in engaging position and said lever also being adapted after having been disengaged for one cycle to push said rocker arm into engaging position, and ratchet means adapted to actuate said trip.

7. A machine for automatically making predetermined lengths of chain from a continuous strip of stock comprising a reciprocating slide adapted to feed the stock forward, a rocker arm on said slide, a trip adapted to hold said rocker arm in engaging position, an operating lever adapted to push said rocker arm into engaging position, and to be connected to said slide by said rocker arm when in engaging position, in combination with a drive shaft actuating said operating lever and ratchet means operated from said drive shaft adapted to actuate said trip intermittently, substantially as described.

8. In a machine for making independent lengths of chain, a reciprocating stock-feeding element, means to cause said element to omit its motion for one cycle of operations to separate the chain of completed links from those being or about to be formed and means to resume making independent lengths of chain automatically after said idle cycle.

In testimony whereof I have signed my name to this specification.

WILLIAM J. GAGNON.